(12) United States Patent
Matsumura et al.

(10) Patent No.: US 10,770,709 B2
(45) Date of Patent: Sep. 8, 2020

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

(72) Inventors: Nobuyuki Matsumura, Mie (JP); Shinichi Takase, Mie (JP); Yusuke Suzuki, Aichi (JP); Atsushi Yamanaka, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/335,482

(22) PCT Filed: Sep. 15, 2017

(86) PCT No.: PCT/JP2017/033493
§ 371 (c)(1),
(2) Date: Mar. 21, 2019

(87) PCT Pub. No.: WO2018/061829
PCT Pub. Date: Apr. 5, 2018

(65) Prior Publication Data
US 2019/0221818 A1    Jul. 18, 2019

(30) Foreign Application Priority Data
Sep. 30, 2016   (JP) .................................. 2016-193673

(51) Int. Cl.
H01M 2/20    (2006.01)
H01M 2/22    (2006.01)
H01M 2/10    (2006.01)

(52) U.S. Cl.
CPC ............. *H01M 2/206* (2013.01); *H01M 2/10* (2013.01); *H01M 2/1077* (2013.01); *H01M 2/20* (2013.01); *H01M 2/22* (2013.01); *H01M 2220/20* (2013.01)

(58) Field of Classification Search
CPC combination set(s) only.
See application file for complete search history.

(56) References Cited

U.S. PATENT DOCUMENTS 3,475,793 A * 11/1969 Oetiker ................. F16L 33/025
                                                                24/20 R
5,499,927 A *  3/1996 Ohno ...................... H01R 13/28
                                                                 29/408
(Continued)

FOREIGN PATENT DOCUMENTS

JP    2002164034    6/2002
JP    3811348       8/2006
(Continued)

OTHER PUBLICATIONS

Official Communication issued in International Bureau of WIPO Patent Application No. PCT/JP2017/033493, dated Nov. 7, 2017.

*Primary Examiner* — Binh B Tran
*Assistant Examiner* — Krystal Robinson
(74) *Attorney, Agent, or Firm* — Greenblum & Bernstein, P.L.C.

(57)    ABSTRACT

A connection module includes: a plurality of bus bars that connect positive and negative electrode terminals of adjacent power storage elements of a plurality of power storage elements; and a sheet member that holds the plurality of bus bars arranged in an alignment direction of the plurality of
(Continued)

power storage elements. The sheet member includes: a plurality of hold portions that hold the bus bars; and extension and contraction portion that is positioned between adjacent hold portions and has an extension and contraction distance equal to or longer than an electrode pitch tolerance between the positive and negative electrode terminals of the adjacent power storage elements in the alignment direction of the plurality of power storage elements.

8 Claims, 13 Drawing Sheets

(56) References Cited

U.S. PATENT DOCUMENTS

| | | | | |
|---|---|---|---|---|
| 5,795,193 | A * | 8/1998 | Yang | H01R 9/2458 439/620.27 |
| 6,544,077 | B2 * | 4/2003 | Ikeda | H01M 2/1077 174/72 R |
| 8,426,056 | B2 * | 4/2013 | Ikeda | H01M 2/206 429/156 |
| 8,777,668 | B2 * | 7/2014 | Ikeda | H01M 2/206 439/627 |
| 8,941,386 | B2 * | 1/2015 | Ikeda | H01M 2/1077 324/426 |
| 9,023,499 | B2 | 5/2015 | Takase et al. | |
| 9,150,115 | B2 * | 10/2015 | Ikeda | H02G 3/0437 |
| 9,178,728 | B2 | 11/2015 | Parikh | |
| 9,515,356 | B2 * | 12/2016 | Zeng | H01M 10/4257 |
| 9,748,540 | B2 | 8/2017 | Ikeda et al. | |
| 2011/0104556 | A1 * | 5/2011 | Kim | H01M 2/206 429/160 |
| 2011/0269321 | A1 * | 11/2011 | Mizoguchi | H01R 12/613 439/77 |
| 2012/0015550 | A1 * | 1/2012 | Ikeda | H01M 2/206 439/391 |
| 2012/0183833 | A1 * | 7/2012 | Ikeda | H01M 10/48 429/121 |
| 2012/0328920 | A1 | 12/2012 | Takase et al. | |
| 2013/0161053 | A1 * | 6/2013 | Okamoto | H01M 2/1077 174/68.1 |
| 2013/0288105 | A1 * | 10/2013 | Niedzwiecki | H01M 10/0481 429/156 |
| 2014/0186676 | A1 * | 7/2014 | Ebisawa | H01R 13/74 429/100 |
| 2015/0010808 | A1 * | 1/2015 | Shoji | H01M 2/206 429/158 |
| 2015/0015318 | A1 | 1/2015 | Parikh | |
| 2015/0056487 | A1 * | 2/2015 | Kobayashi | H01M 10/0468 429/120 |
| 2015/0333312 | A1 * | 11/2015 | Nakamoto | H01M 2/1077 429/153 |
| 2015/0380699 | A1 | 12/2015 | Ikeda et al. | |
| 2016/0172652 | A1 * | 6/2016 | Ichikawa | H01M 2/206 429/121 |
| 2017/0110705 | A1 * | 4/2017 | Tosaya | H01M 2/206 |
| 2017/0179458 | A1 | 6/2017 | Sato et al. | |
| 2017/0179459 | A1 | 6/2017 | Sato et al. | |
| 2017/0179460 | A1 | 6/2017 | Gotoh et al. | |
| 2019/0103595 | A1 * | 4/2019 | Matsumura | H01M 2/206 |
| 2019/0109423 | A1 * | 4/2019 | Shimoda | H01G 2/04 |
| 2019/0221818 | A1 * | 7/2019 | Matsumura | H01M 2/20 |
| 2019/0363318 | A1 * | 11/2019 | Okutani | B23K 20/10 |

FOREIGN PATENT DOCUMENTS

| | | | |
|---|---|---|---|
| JP | 2011210710 | | 10/2011 |
| JP | 2013045508 | | 3/2013 |
| JP | 2013045508 A | * | 3/2013 |
| JP | 2014175291 | | 9/2014 |
| JP | 2015019352 | | 1/2015 |
| JP | 2016207427 | | 12/2016 |
| JP | 2017083955 | | 5/2017 |
| JP | 2017-112063 | | 6/2017 |
| JP | 2017-112066 | | 6/2017 |
| JP | 2017-112067 | | 6/2017 |
| JP | 2017162715 | | 9/2017 |

* cited by examiner

CONNECTION MODULE

TECHNICAL FIELD

The present invention relates to a connection module, more specifically a connection module for use in a power storage module.

BACKGROUND ART

Power storage modules for vehicles such as electric cars and hybrid cars have an array of a plurality of power storage elements with positive and negative electrode terminals. The electrode terminals of the adjacent power storage elements are connected together by bus bars such that the plurality of power storage elements are connected in series or in parallel.

In general, there exists an electrode pitch tolerance between the electrode terminals of adjacent power storage elements. To follow the electrode pitch tolerance, there are known techniques for holding individual bus bars in a connection module such that the adjacent bus bars are movable (for example, refer to Patent Document 1). In a battery connection plate (connection module) described in Patent Document 1, connection members (bus bars) are stored in a plurality of divided plate main bodies that have flexible portions and are movable independently from electrodes, thereby to follow an electrode pitch tolerance.

RELATED ART DOCUMENT

Patent Document

Patent Document 1: Japanese Unexamined Patent Application Publication No. 2002-164034

DISCLOSURE OF THE PRESENT INVENTION

Problem to be Solved by the Invention

In the battery connection plate (connection module) described in Patent Document 1, the electrode pitch tolerance can be followed by the divided plate main bodies, but the divided plate main bodies are large in volume such that the entire connection module becomes large in size, which is not convenient for weight reduction.

Accordingly, there is provided a connection module described herein that achieves weight reduction by a simple structure and follows an electrode pitch tolerance in the alignment direction of power storage elements in a power storage element group.

Means for Solving the Problem

A connection module disclosed herein is a connection module that is to be attached to a power storage element group in which a plurality of power storage elements with positive and negative electrode terminals are aligned. The connection module includes: a plurality of bus bars that connect the positive and negative electrode terminals of adjacent power storage elements of the plurality of power storage elements; and a sheet member that holds the plurality of bus bars arranged in an alignment direction of the plurality of power storage elements. The sheet member includes: a plurality of hold portions that hold the bus bars; and an extension and contraction portion that is positioned between adjacent hold portions and has an extension and contraction distance equal to or longer than an electrode pitch tolerance between the positive and negative electrode terminals of the adjacent power storage elements in the alignment direction.

According to this configuration, the connection module can be formed by the plurality of bus bars and the sheet member holding the plurality of bus bars. The bus bars can be moved by the distance equal to or longer than the electrode pitch tolerance by the extension and contraction of the extension and contraction portion included in the sheet member in the alignment direction of the plurality of power storage elements. Therefore, according to the connection module of this configuration, it is possible to achieve weight reduction by a simple structure and follow the electrode pitch tolerance in the alignment direction of the power storage elements in the power storage element group.

In the connection module, each of the bus bars may have a protrusion portion that protrudes from one end as seen in a width direction, and each of the bus bars may be held by the hold portion via the protrusion portion.

According to this configuration, there is no need to hold the entire bus bars by the sheet member. This makes it possible to miniaturize the planar shape of the sheet member, thereby achieving further weight reduction of the connection module.

The connection module may be configured such that the protrusion portions of the bus bars have through holes, the hold portions have hold holes at positions corresponding to the through holes, and the bus bars are fixed to the hold portions by fixing members that penetrate the through holes and the hold holes.

According to this configuration, the fixing members are formed by rivets, for example, so that the rivets can be inserted and crimped into the through holes and the hold holes to fix the bus bars to the hold portions. That is, the bus bars can be easily held on the hold portions via the protrusion portions.

The connection module may be configured such that the extension and contraction portion is formed integrally with the hold portions and has a U shape in a planar view, and the extension and contraction portion has two ends that are positioned at an opening of one or more U shapes and connected to each one end of the adjacent hold portions as seen in the alignment direction.

According to this configuration, it is easy to implement the extension and contraction portion extending and contracting in the alignment direction of the plurality of power storage elements. The extension and contraction portion can be formed from the planar shape integrally with the hold portions in an easy manner by two-dimensional punching of the sheet member, for example.

The connection module may further include a support member that is provided on a side of the plurality of bus bars opposed to a side held by the sheet member and supports the bus bars in a movable manner in the alignment direction.

According to this configuration, providing the support member allows the bus bars to be supported by the support member. It is thus possible to prevent, at the time of attachment of the connection module to the power storage elements, the connection module from sagging due to the weight of the metallic bus bars. This allows the attachment to be smoothly performed. The bus bars are movably supported, which is adaptable to the electrode pitch tolerance.

The connection module may be configured such that the support member is formed by another sheet member identical in structure to the sheet member, and each of the bus bars has another protrusion portion and another through hole corresponding to the other sheet member.

According to this configuration, the other sheet member can constitute the support member that supports the bus bars in such a manner as to be movable in the alignment direction of the plurality of power storage elements.

The connection module may be configured such that the support member is formed by a guide rail having a guide portion to retain the bus bars in the movable manner, and each of the bus bars has a retainer pawl to be retained in the guide portion.

According to this configuration, the guide rail can constitute a support member that supports the bus bars in such a manner as to be movable in the alignment direction of the plurality of power storage elements.

Advantageous Effect of the Invention

According to the connection module of the present invention, it is possible to achieve weight reduction by a simple structure and follow the electrode pitch tolerance in the alignment direction of the power storage elements in the power storage element group.

MODES FOR CARRYING OUT THE INVENTION

First Embodiment

A first embodiment according to the present invention will be described with reference to FIGS. 1 to 9.

Figure 1:
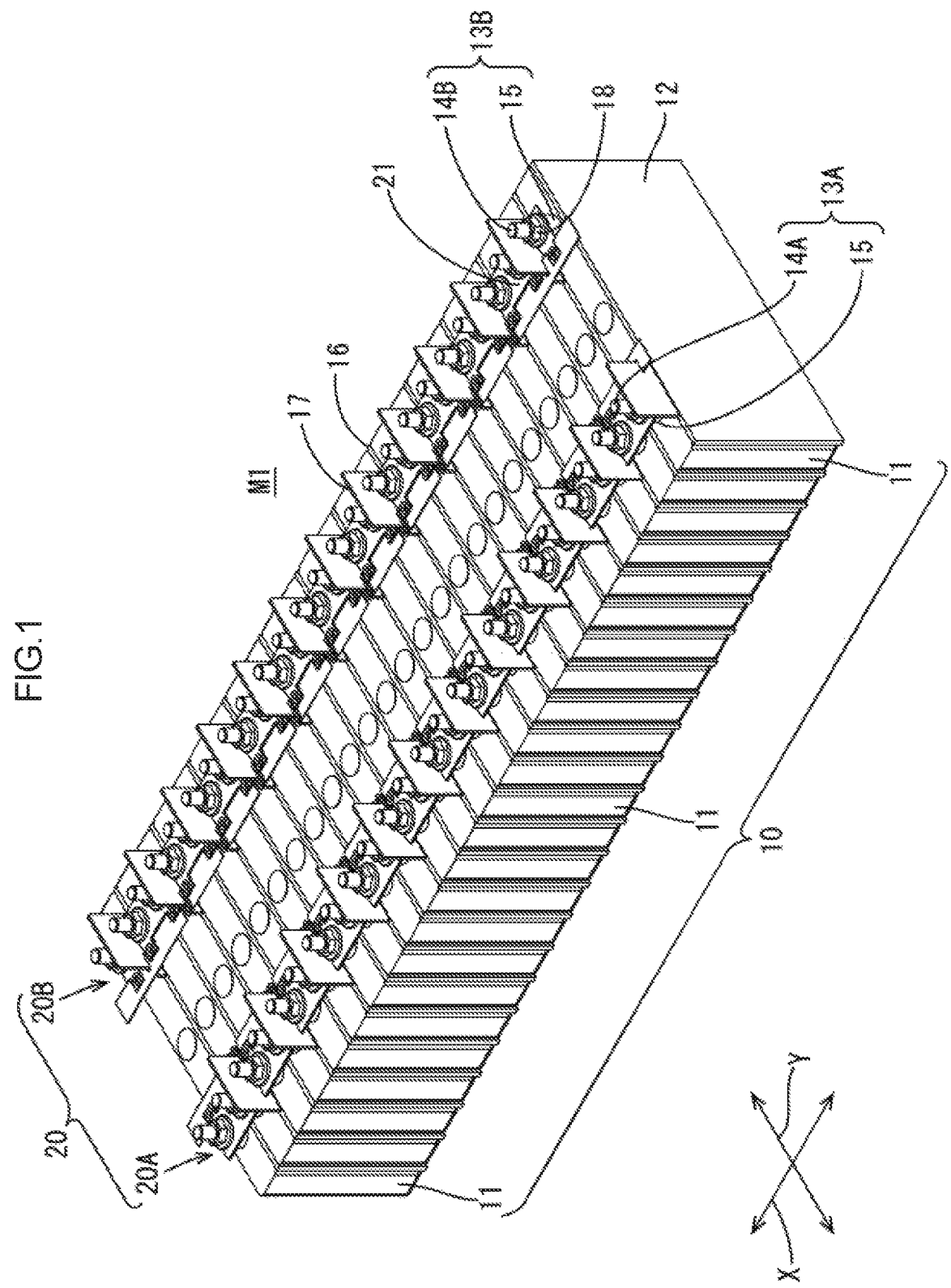
FIG. 1 is a perspective view of a power storage module including a connection module according to a first embodiment.

As illustrated in FIG. 1, a power storage module M1 includes a connection module 20 in the first embodiment and a power storage element group 10 formed by aligning a plurality of power storage elements 11.

The power storage module M1 is used as a drive source for a vehicle such as electric car or hybrid car, for example. In the following descriptions, for a plurality of identical members, one of them may be given a reference symbol and the other members may be given no reference symbol and descriptions thereof may be omitted.

1. POWER STORAGE ELEMENT GROUP

Figure 2:
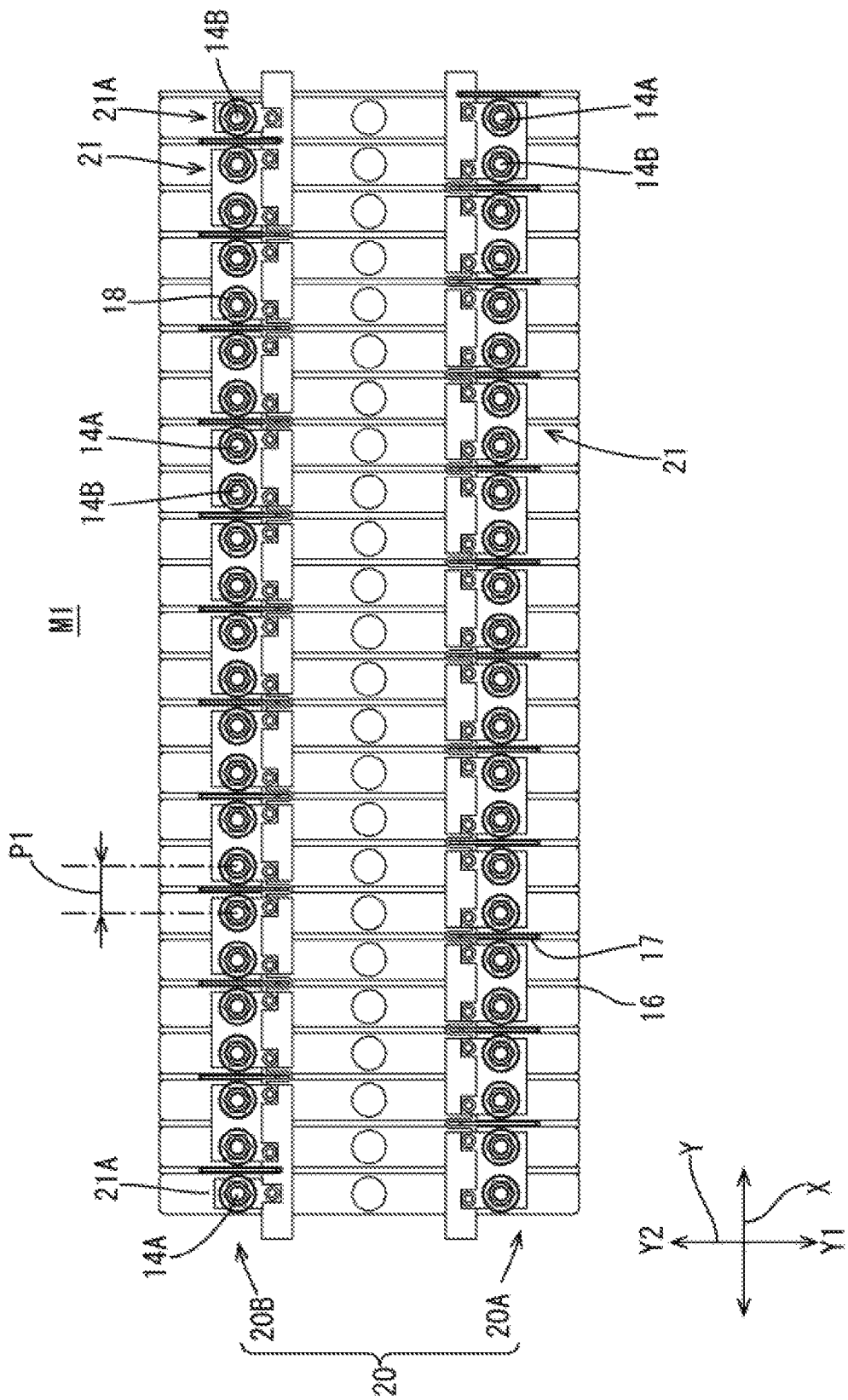
FIG. 2 is a planar view of the power storage module.

The power storage element group 10 to which the connection module 20 in the first embodiment is to be attached has a plurality of (24 in the present embodiment) power storage elements 11 aligned as illustrated in FIGS. 1 and 2.

Each of the power storage elements 11 has a positive electrode terminal portion 13A and a negative electrode terminal portion 13B that vertically protrude from an upper surface of a main body portion 12 in the shape of a flat rectangular parallelepiped that stores power storage components not illustrated.

Each of the electrode terminal portions 13 (13A and 13B) includes a terminal base 15 formed in the shape of a disc and electrode terminals 14 (14A and 14B) that are cylindrical in shape and protrude upward from the terminal base 15. The terminal insertion holes 24 of the bus bars 21 are to be inserted into the electrode terminals 14 (see FIG. 3). Each of the electrode terminals 14 has a screw thread (not illustrated) at a side wall portion into which a nut 18 is to be screwed.

When the bus bars 21 inserted into the electrode terminals 14 and the terminal bases 15 are brought into contact with each other, the bus bars 21 and the electrode terminals 14 are electrically connected to each other. The plurality of power storage elements 11 are disposed such that the electrode terminals 14 adjacent to each other in a lateral direction (arrow X direction) illustrated in FIG. 2 are opposite in polarity.

Separators 16 are provided between the adjacent power storage elements 11. Each of the separators 16 has an insulation rib 17 to insulate the electrode terminals 14 of the adjacent power storage elements 11.

2. CONNECTION MODULE

Figure 3:
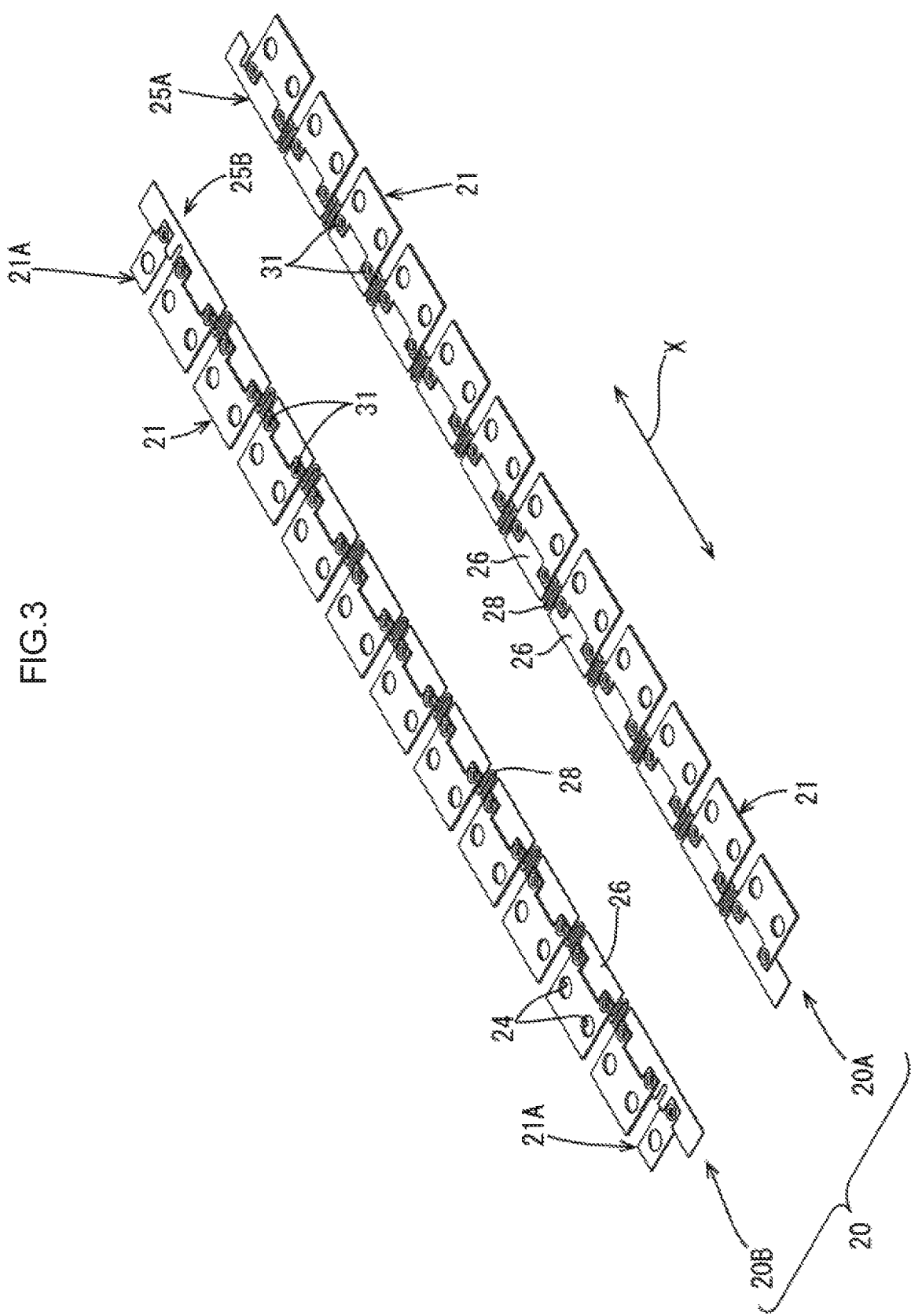
FIG. 3 is a perspective view of the connection module according to the first embodiment.

The connection module 20 is attached to the power storage element group 10 along the alignment direction of the power storage elements 11 (arrow X direction) as illustrated in FIGS. 1 and 2, and has a function of electrically connecting the plurality of power storage elements 11. The connection module 20 includes the bus bars 21 and the sheet member 25 as illustrated in FIG. 3. As illustrated in FIG. 2, the connection module 20 includes a first connection module 20A that is attached to the power storage element group 10 on the lower side (arrow Y1 direction side) in FIG. 2 and a second connection module 20B that is attached to the power storage element group 10 on the upper side (arrow Y2 direction side). The first connection module 20A and the second connection module 20B are different only in both end portions. Specifically, the second connection module 20B is provided with external connection electrode bus bars 21A to take electric power from the power storage element group 10. Accordingly, the connection modules 20A and 20B will be hereinafter described as "connection module 20" unless there is a particular need for differentiation.

2-1. Bus Bars

The bus bars 21 connect the positive and negative electrode terminals 14A and 14B of the adjacent power storage elements 11. The bus bars 21 are formed from metal such as copper, copper alloy, stainless steel (SUS), or aluminum. Each of the bus bars 21 includes a plate-shaped portion 22 with a length corresponding to a dimension (electrode pitch) P1 (see FIG. 2) between the adjacent electrode terminals 14A and 14B.

Figure 4:
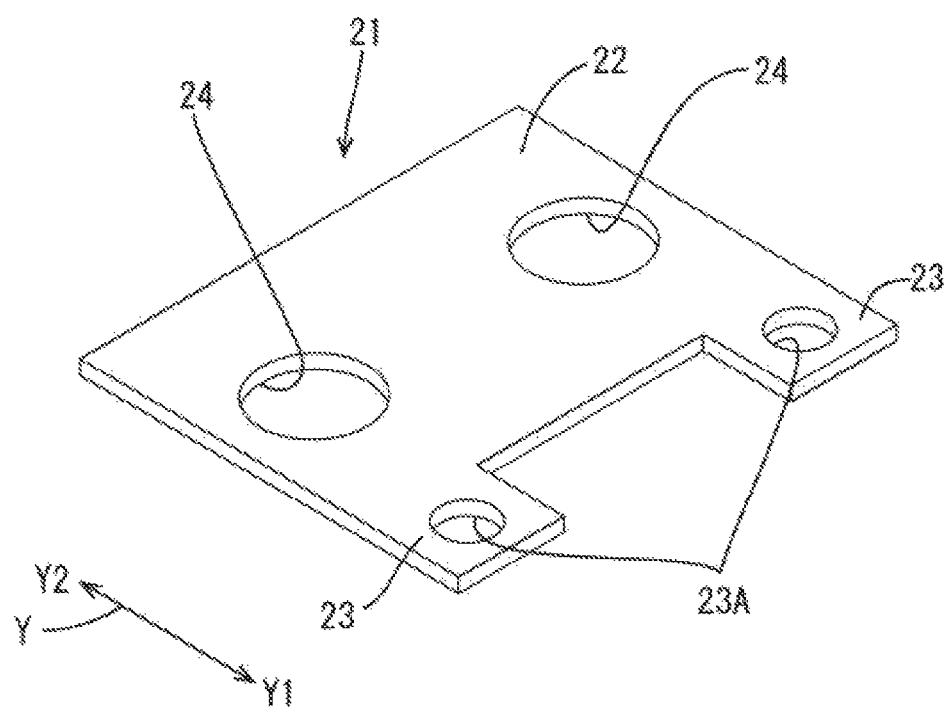
FIG. 4 is a perspective view of a bus bar.
Figure 5:
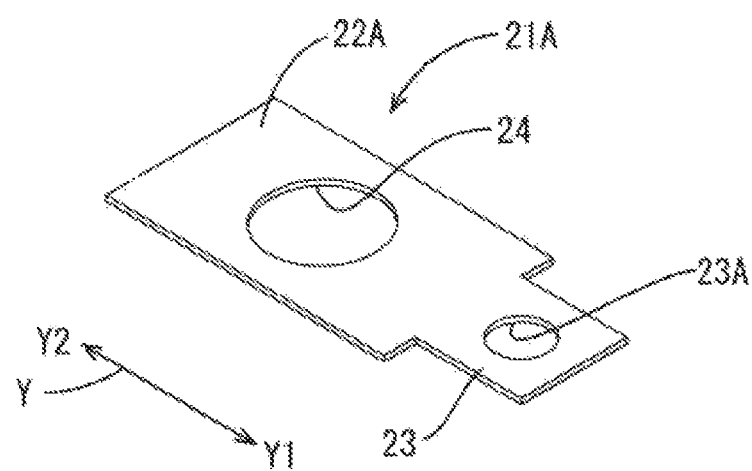
FIG. 5 is a perspective view of an external connection electrode bus bar.

Each of the plate-shaped portions 22 of the bus bars 21, except for the external connection electrode bus bars 21A at the both ends of the second connection module 20B, has a pair of terminal insertion holes 24, 24 therethrough into which the electrode terminals 14 are to be inserted as illustrated in FIG. 4. Each of plate-shaped portions 22A of the external connection electrode bus bars 21A has only one terminal insertion hole 24 therethrough as illustrated in FIG. 5. The terminal insertion holes 24 have the shape of an oval elongated in the alignment direction of the power storage elements 11 (the arrow X direction illustrated in FIG. 1).

Each of the bus bars 21 also has protrusion portions 23 that protrude from one end as seen in the width direction (the arrow Y direction), that is, from one long-side portion of the bus bar 21 as illustrated in FIG. 4. In the present embodiment, the protrusion portions 23 are provided on both ends of one long-side portion. Each of the protrusion portions 23 has a through hole 23A. As illustrated in FIG. 3, each of the bus bars 21 is fixed to a hold portion 26 of a sheet member 25 described later by rivets 31 penetrating through the through holes 23A and hold holes 27 of the sheet member 25 described later.

As described above, in the present embodiment, only the protrusion portions 23 of the bus bars 21 are directly held on the sheet member 25 such that the entire bus bars 21 are held on the sheet member 25. That is, the plate-shaped portions 22 of the bus bars 21 with the terminal insertion holes 24, 24 are not directly held on the sheet member 25.

In addition, as illustrated in FIG. 5, each of the external connection electrode bus bars 21A also has a protrusion portion 23 with a through hole 23A at one end of the electrode bus bars 21A and is held at the protrusion portion 23 on the sheet member 25.

2-2. Sheet Member

Figure 6:
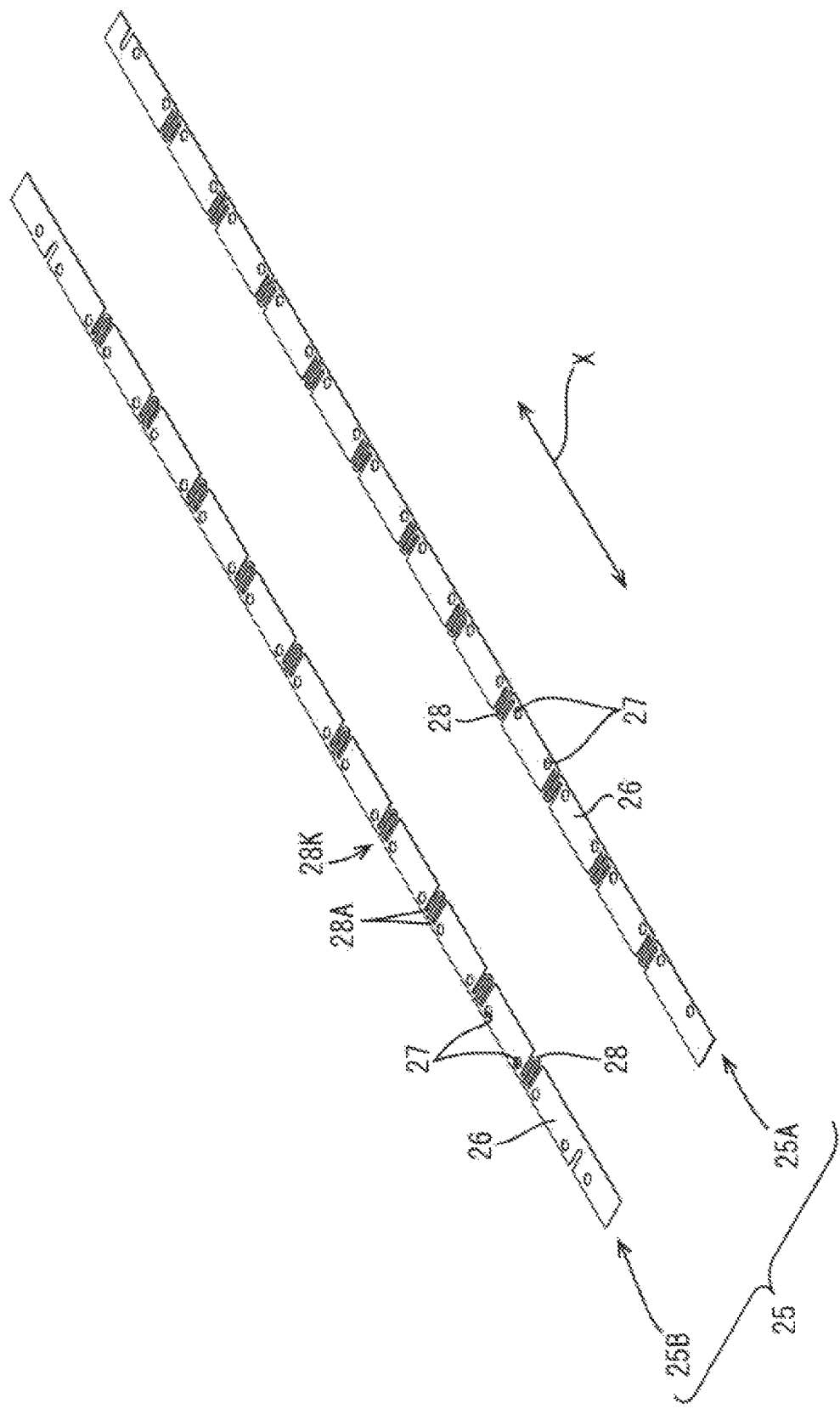
FIG. 6 is a perspective view of a sheet member of the connection module.

The sheet member 25 is elongated and substantially rectangular in a planar view and holds the bus bars 21 as illustrated in FIG. 6. The sheet member 25 includes a first sheet member 25A included in the first connection module 20A and a second sheet member 25B included in the second connection module 20B. The first sheet member 25A and the second sheet member 25B are different only in the structure of both ends. Accordingly, the sheet members 25A and 25B will be hereinafter described as "sheet member 25" unless there is no particular need for differentiation.

The sheet member 25 holds the plurality of bus bars 21 arranged in the alignment direction of the power storage elements 11 (the arrow X direction illustrated in FIG. 2). In the present embodiment, the sheet member 25 is formed form a rigid, non-stretchable, and electrically insulating material. Examples of material for the sheet member 25 include insulating materials such as polyethylene terephthalate (PET), polystyrene (PS), polycarbonate (PC), and polyamide (PA). In the present embodiment, the sheet member 25 is a hard synthetic resin sheet such as a polycarbonate sheet, for example. In other words, the sheet member 25 is formed from a synthetic resin without rubber elasticity. The planar shape of the sheet member 25 is not limited to that illustrated in FIG. 6. In addition, the material for the sheet member 25 is not limited to a rigid and non-stretchable material.

Figure 7:
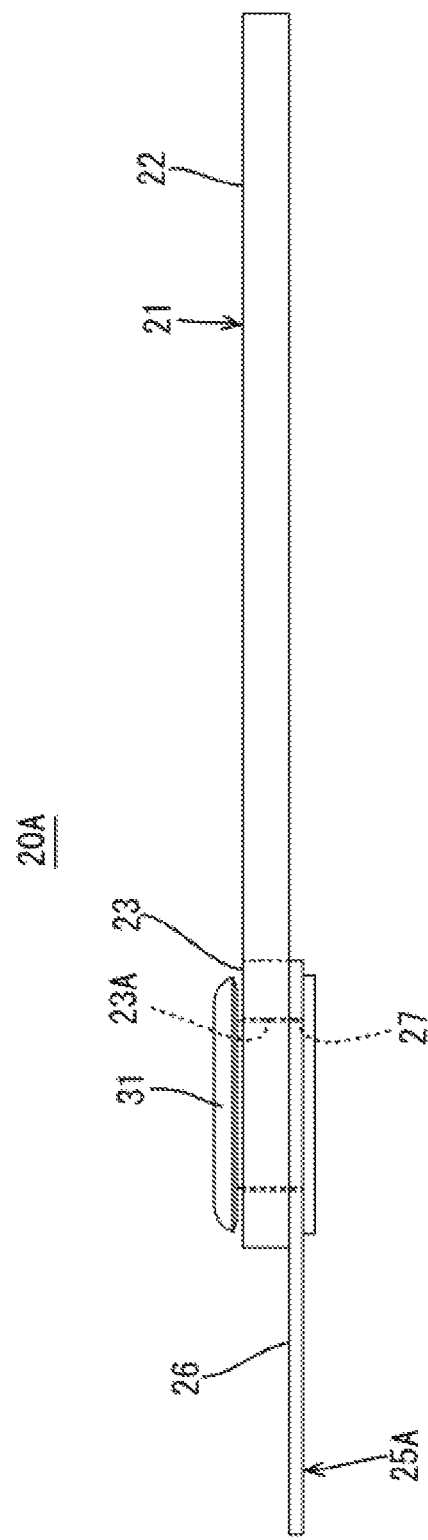
FIG. 7 is a side view of the connection module.
Figure 8:
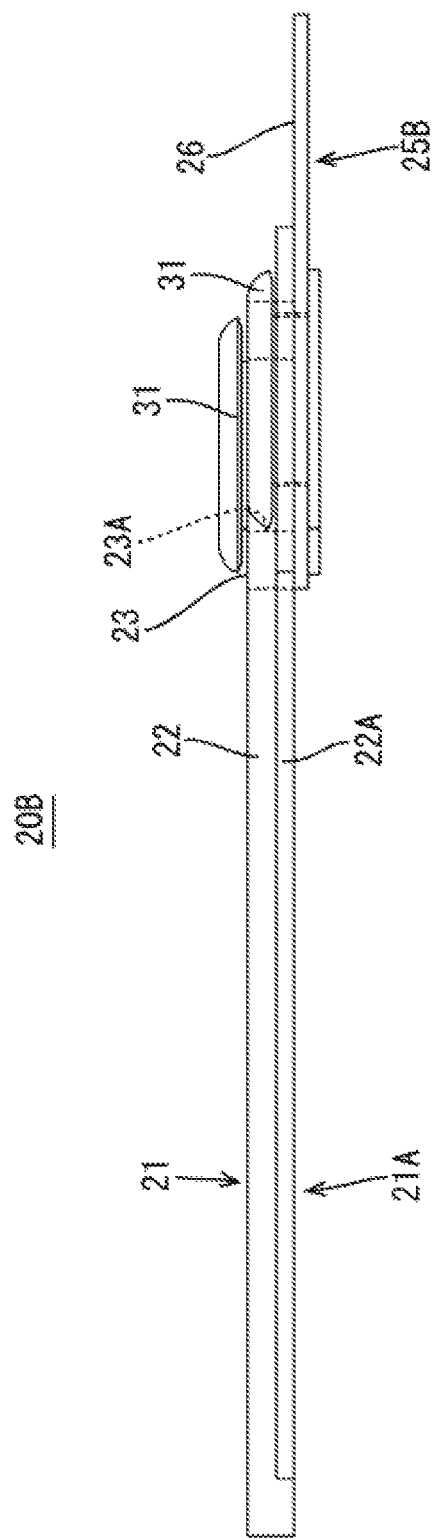
FIG. 8 is another side view of the connection module.

The sheet member 25 includes the hold portions 26 and extension and contraction portions 28. Each of the hold portions 26 has a pair of hold holes 27 at positions corresponding to the pair of through holes 23A of the bus bar 21. As described above, each of the bus bars 21 is fixed to the hold portion 26 of the sheet member 25 by the rivets 31 penetrating through the through holes 23A of the protrusion portions 23 and the hold holes 27 of the sheet member 25 as illustrated in FIGS. 7 and 8. In this case, the rivets 31 are an example of "fixing members". The fixing members are not limited to the rivets 31. FIG. 7 is a side view of the first connection module 20A, and FIG. 8 is a side view of the second connection module 20B.

Each of the extension and contraction portions 28 is positioned between the adjacent hold portions 26 and is integrally formed with the hold portion 26 as illustrated in FIG. 6. The extension and contraction portions 28 extend and contract in the alignment direction of the power storage elements 11 (the arrow X direction illustrated in FIG. 2). In the present embodiment, the extension and contraction portions 28 have U shape in a planar view and are formed by two-dimensional punching of the sheet member 25. Each of the extension and contraction portions 28 has two ends 28A positioned at an opening 28K in the U shape and connected to each one end of the adjacent hold portions 26 as seen in the alignment direction of the power storage elements 11. This configuration of the extension and contraction portions 28 allows the connection module 20 to follow the electrode pitch tolerance between the adjacent power storage elements 11. FIG. 6 illustrates an example in which each of the extension and contraction portions 28 has one U shape. However, the extension and contraction portions 28 are not limited to this shape but may have two U shapes, for example. That is, each of the extension and contraction portions 28 has at least one or more U shapes.

Figure 9:
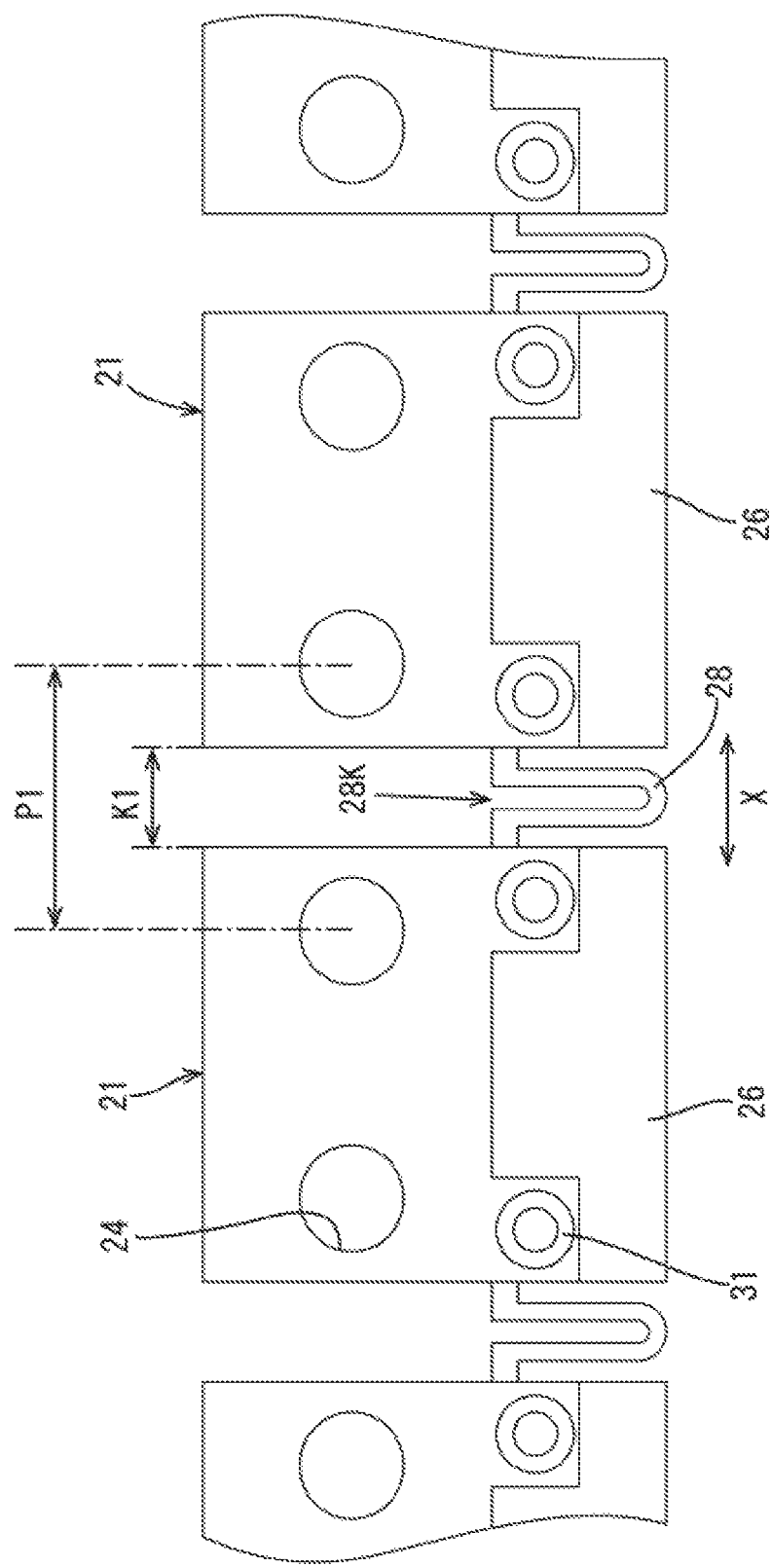
FIG. 9 is a partial enlarged planar view of the connection module.

Specifically, as illustrated in FIG. 9, each of the extension and contraction portions 28 extends and contracts in the arrow X direction as the opening 28K in the extension and contraction portion 28 opens and closes in the arrow X direction. Accordingly, a space K1 between the adjacent bus bars 21 can be adjusted such that the connection module 20 can follow the tolerance of electrode pitch P1 between the adjacent power storage elements 11. In this case, the extension and contraction distance by which each of the extension and contraction portions 28 can extend and contract in the arrow X direction is set to be equal to or longer than the electrode pitch tolerance. For example, when the electrode pitch tolerance is ±1 mm, each of the extension and contraction portions 28 can contract by 1 mm or more from a standard state without extension and contraction in the arrow X direction and can extend by 1 mm or more from the standard state in the arrow X direction. FIG. 9 illustrates the standard state of the extension and contraction portions 28.

3. METHOD OF PRODUCING THE CONNECTION MODULE

A hard resin sheet is cut at once by, for example, two-dimensional punching into the shape illustrated in FIG. 6 to produce the sheet member 25. At the same time, the extension and contraction portions 28 and the hold holes 27 are formed by two-dimensional punching.

Next, the bus bars 21 and 21A are fixed by the rivets 31 to the hold portions 26 of the sheet member 25. Accordingly, the connection module 20 as illustrated in FIG. 3 can be obtained.

4. METHOD OF ASSEMBLING THE CONNECTION MODULE

Next, a method of assembling the connection module 20 into the power storage element group 10 will be described. The plurality of power storage elements 11 are aligned such that the adjacent electrode terminals 14 are opposite in polarity. Then, the separators 16 with the insulation ribs 17 and the power storage elements 11 are alternately disposed to sandwich the power storage element 11 between the separators 16.

Next, the connection module 20 is placed on the surface with the electrode terminals 14. The connection module 20 is attached and the electrode terminals 14 of the power storage element group 10 are inserted into the terminal insertion holes 24 of the bus bars 21, whereby the power storage module M1 as illustrated in FIG. 1 can be obtained. At that time, in the connection module 20 of the present embodiment, the sheet member 25 is provided with the extension and contraction portions 28. Accordingly, the connection module 20 can be attached to the power storage element group 10 while adjusting the space K1 between the adjacent bus bars 21. Therefore, the connection module 20 can be easily attached to the power storage element group 10.

5. ADVANTAGEOUS EFFECTS OF THE FIRST EMBODIMENT

The connection module 20 is simply formed from the plurality of bus bars 21 and the sheet member 25 holding the plurality of bus bars 21. In addition, the extension and contraction of the extension and contraction portions 28 in a U shape in a planar view included in the sheet member 25 allows the bus bars 21 to move by a distance equal to or longer than the electrode pitch tolerance in the alignment direction of the plurality of power storage elements 11 (the arrow X direction illustrated in FIG. 2) when the bus bars 21 are attached to the electrode terminals 14 of the power storage elements 11. Therefore, according to the connection module 20 in the present embodiment, it is possible to achieve weight reduction of the connection module 20 by a simple structure and follow the electrode pitch tolerance in the alignment direction of the power storage elements in the power storage element group 10.

The bus bars 21 are held on the sheet member 25 only at the protrusion portions 23. Accordingly, in the present embodiment, there is no need to hold the entire bus bars 21 on the sheet member 25, which makes it possible to miniaturize the planar shape of the sheet member 25, thereby achieving further weight reduction of the connection module 20.

In the first embodiment, the bus bars 21 are fixed to the sheet member 25 by inserting and crimping the rivets (fixing members) 31 into the through holes 23A of the protrusion portions 23 and the hold holes 27 of the sheet member 25. Accordingly, the bus bars 21 can be easily held on the hold portions 26 via the protrusion portions 23.

In the first embodiment, the extension and contraction portions extending and contracting in the alignment direction of the plurality of power storage elements 11 are formed by the U-shaped extension and contraction portions 28 through two-dimensional punching of the sheet member 25. Accordingly, the extension and contraction portions can be easily implemented.

Second Embodiment

Next, a second embodiment according to the present invention will be described with reference FIGS. 10 to 13. The second embodiment is different from the first embodiment in that a support member 40 is additionally provided, and thus only that difference will be described. The same components as those in the first embodiment will be given the same reference symbol as those in the first embodiment and descriptions thereof will be omitted.

The support member 40 is provided on the side (see arrow the Y2 side illustrated in FIGS. 4 and 5) of the plurality of bus bars 21 opposed to the side held by the sheet member 25 (see arrow the Y1 side illustrated in FIGS. 4 and 5) to support the bus bars 21 in such a manner as to be movable in the alignment direction of the plurality of power storage elements 11 (arrow the X direction illustrated in FIG. 2). In this way, the support member 40 is provided to support the bus bars 21. Accordingly, it is thus possible to, at the time of attachment of the connection module 20 to the power storage elements 11, prevent the connection module from sagging due to the weight of the metallic bus bars 21. This allows the attachment to be smoothly performed. In addition, the bus bars 21 are movably supported, which is adaptable to the electrode pitch tolerance. First and second examples of the support member 40 will be described below.

6. EXAMPLES OF THE SUPPORT MEMBERS

6-1. First Example

Figure 10:
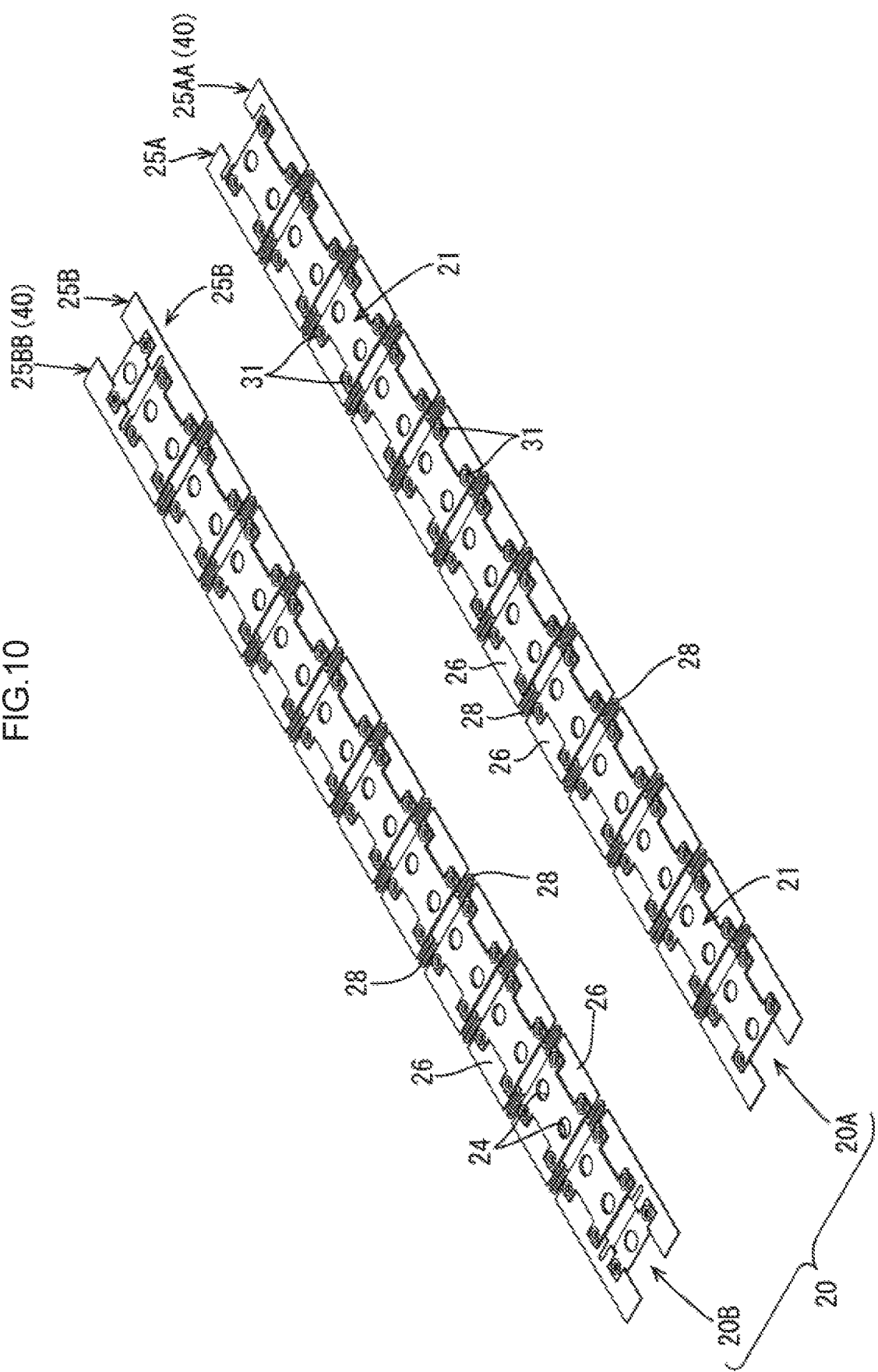
FIG. 10 is a perspective view of a connection module according to a second embodiment.

In the first example, the support member 40 is formed from another sheet member 25 that is identical in configuration to the sheet member 25 as illustrated in FIG. 10. That is, as illustrated in FIG. 10, another sheet member 25AA equivalent to the support member 40 holds the bus bars 21 in a manner opposed to the sheet member 25A in the first embodiment. Another sheet member 25BB equivalent to the support member 40 holds the bus bars 21 in a manner opposed to the sheet member 25B in the first embodiment.

Figure 11:
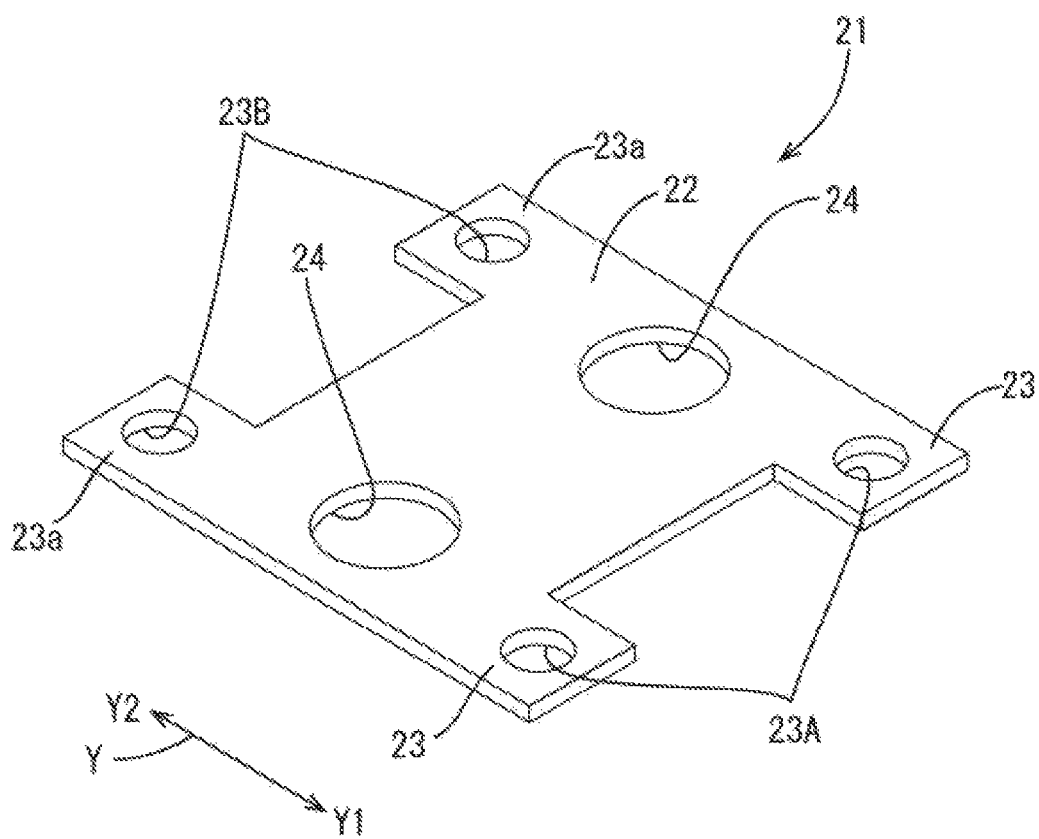
FIG. 11 is a perspective view of a bus bar in the second embodiment.

As illustrated in FIG. 11, each of the bus bars 21 has other protrusion portions 23a and other through holes 23B corresponding to the other sheet member (25AA, 25BB). Although not illustrated, each of the bus bars 21A also has a protrusion portion 23a and a through hole 23B.

Each of the bus bars 21 is supported on the other sheet member (25AA, 25BB) by rivets 31 penetrating the other through holes 23B and the other hold holes 27 formed in the other sheet member 25. Since the other sheet members (25AA and 25BB) have U-shaped extension and contraction portions 28, each of the bus bars 21 is supported on the other sheet member (25AA, 25BB) in such a manner as to be movable in the arrow X direction illustrated in FIG. 2.

6-2. Second Example

Figure 12:
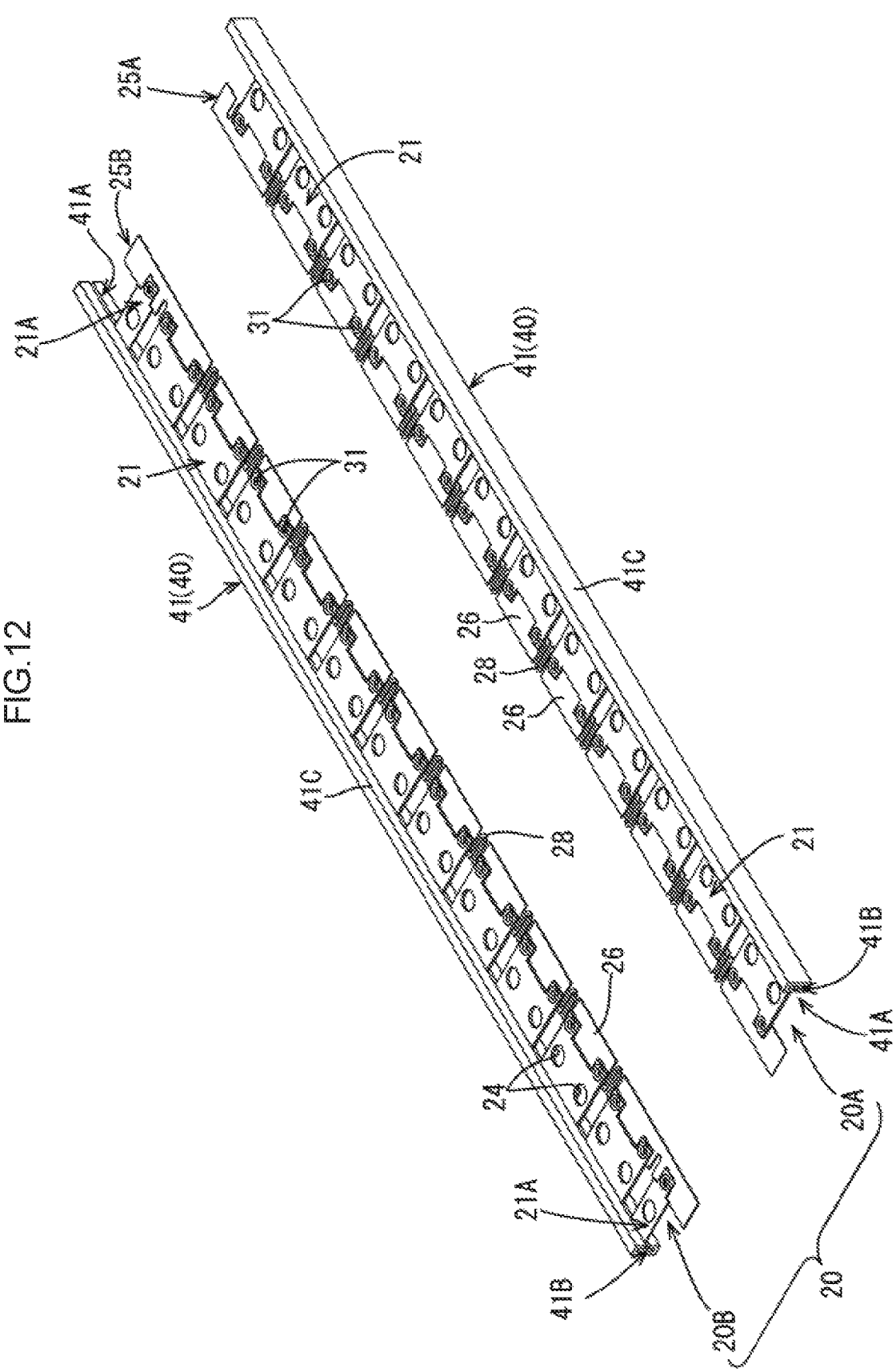
FIG. 12 is a perspective view of another example of a connection module according to the second embodiment.

In the second example, as illustrated in FIG. 12, the support member 40 is formed from guide rails 41 that have guide portions movably supporting the bus bars 21. In this case, each of the guide portions is formed from a slit 41A and a guide path 41B. The slit 41A and the guide path 41B are formed by a peripheral wall portion 41C constituting the guide rail 41. That is, the slit 41A is a cut portion in the peripheral wall portion 41C, and the guide path 41B is a space surrounded by the peripheral wall portion 41C. The guide rails 41 equivalent to the support member 40 movably support the bus bars 21 in a manner opposed to the sheet members (25A, 25B) in the first embodiment as illustrated in FIG. 12.

Figure 13:
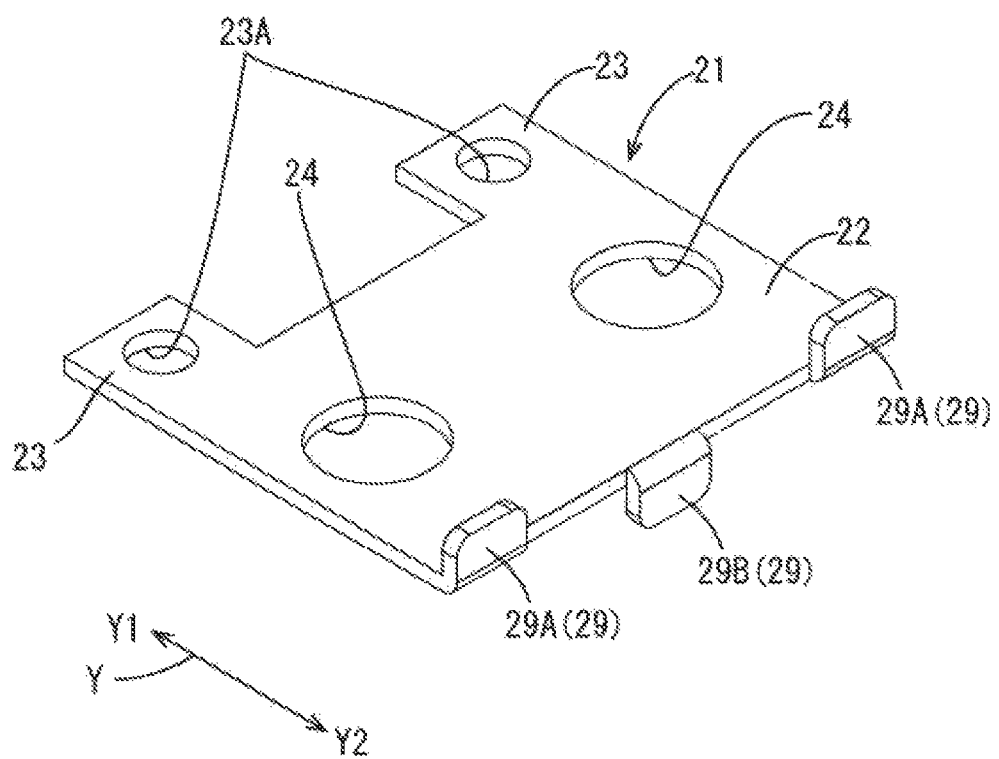
FIG. 13 is a perspective view of a bus bar of the connection module in the example illustrated in FIG. 12.

Each of the bus bars 21 has retainer pawls 29 (29A, 29B) that are retained at the guide portions (41A, 41B) of the guide rails 41 as illustrated in FIG. 13. Each of the retainer pawls 29A is bent upward from the plate-shaped portion 22, and the retainer pawl 29B is bent downward from the plate-shaped portion 22. When the guide rails 41 are attached to the bus bars 21, the retainer pawls 29A and 29B are positioned in the guide paths 41B. The retainer pawls (29A, 29B) are shaped such that the bus bars 21 are movable in the guide paths 41B in the alignment direction of the bus bars 21 (the arrow X direction illustrated in FIG. 2). In the present example, the two retainer pawls 29A and the one retainer pawl 29B, the total three retainer pawls 29 are formed. However, the number and shape of the retainer pawls 29 can be arbitrarily set. Although not illustrated, the bus bars 21A also have retainer pawls 29.

The bus bars 21 are attached to the guide rails 41 by moving each one end of the guide rails 41 in order from the bus bar 21 positioned at the end of the connection module 20 in the alignment direction of the bus bars 21 (the arrow X direction illustrated in FIG. 2). At that time, the retainer pawls (29A and 29B) of the bus bars 21 are positioned in the guide paths 41B and the plate-shaped portions 22 of the bus bars 21 are sandwiched in the slits 41A. Accordingly, the guide rails 41 can be attached to the bus bars 21 as illustrated in FIG. 12. While being attached to the guide rails 41, the bus bars 21 are supported on the guide rails 41 in such a manner as to be movable in the arrow X direction illustrated in FIG. 2. That is, the bus bars 21 are movably supported on the guide rails 41 via the retainer pawls 29.

Other Embodiments

The present invention is not limited to the embodiments described above and illustrated in the drawings. For example, the following embodiments also fall within the technical scope of the present invention:

(1) In the foregoing embodiments, the extension and contraction portions extending and contracting in the alignment direction of the plurality of power storage elements 11 are formed by the extension and contraction portions 28 in the U shape in a planar view through two-dimensional punching of the sheet member 25. However, the extension and contraction portions are not limited to this. For example, the extension and contraction portions 28 may have a V shape in a planar view or a squared U-shape in a planar view. In addition, the extension and contraction portions may not be necessarily formed by punching. In short, the extension and contraction portions have an extension and contraction distance equal to or longer than the electrode pitch tolerance as the extension and contraction distance in the alignment direction of the plurality of power storage elements 11.

(2) In the foregoing embodiments, the bus bars 21 have the protrusion portions 23 and are held by the sheet member 25 only at the protrusion portions 23. However, the bus bars 21 are not limited to this configuration. For example, the plate-shaped portions 22 of the bus bars 21 may also be partially held by the sheet member 25.

(3) In the foregoing embodiments, the bus bars 21 are held at the hold portions 26 of the sheet member 25 via the protrusion portions 23 by using the through holes 23A, the hold holes 27, and the rivets 31. However, the bus bars 21 are not limited to this configuration. For example, the hold portions 26 may be provided with crimping portions penetrating through the through holes 23A at positions corresponding to the positions of the through holes 23A of the bus bars 21 such that the bus bars 21 can be held at the hold portions 26 by crimping the crimping portions.

(4) In the second embodiment, the configuration of the support member 40 is not limited to those in the first and second examples. For example, the support member may be configured such that the guide rails 41 in the second example are divided into two in the middle. In this case, the attachment of the guide rails 41 to the bus bars 21 can be simplified as compared to the case where the guide rails 41 are not divided.

EXPLANATION OF SYMBOLS

10: Power storage element group
11: Power storage element
14: Electrode terminal
20: Connection module
20A: First connection module (Connection module)
20B: Second connection module (Connection module)
21: Bus bar
23: Protrusion portion
23A: Through hole
25: Sheet member
25A: First sheet member (Sheet member)
25AA: Another sheet member (Support member)
25B: Second sheet member (Sheet member)
25BB: Another sheet member (Support member)
26: Hold portion
27: Hold hole
28: Extension and contraction portion
40: Support member
41: Guide rail (Support member)
M1: Power storage module

The invention claimed is:

1. A connection module to be attached to a power storage element group in which a plurality of power storage elements with positive and negative electrode terminals are aligned, the connection module comprising:
a plurality of bus bars that connect the positive and negative electrode terminals of adjacent power storage elements of the plurality of power storage elements; and
a sheet member that holds the plurality of bus bars arranged in an alignment direction of the plurality of power storage elements,
wherein the sheet member includes:
a plurality of holders that hold the bus bars; and
an extension and contraction structure that is positioned between adjacent holders and has an extension and contraction distance equal to or longer than an electrode pitch tolerance between the positive and negative electrode terminals of the adjacent power storage elements in the alignment direction, the extension and contraction structure being extendable and contractible from a state of the extension and contraction structure that is without extension and contraction, wherein
each of the bus bars has a protrusion portion that protrudes from one end as seen in a width direction, and
each of the bus bars is held by a holder of the holders via the protrusion portion.

2. The connection module according to claim 1, wherein the protrusion portions of the bus bars have through holes, the holders have hold holes at positions corresponding to the through holes, and
the bus bars are fixed to the holders by fixing fasteners that penetrate the through holes and the hold holes.

3. The connection module according to claim 1, wherein the extension and contraction structure is formed integrally with the holders and has one or more U shapes in a planar view, and
the extension and contraction structure has two ends that are positioned at an opening of the one or more U shapes and connected to each one end of the adjacent holders as seen in the alignment direction.

4. The connection module according to claim 1, further comprising a support member that is provided on a side of the plurality of bus bars opposed to a side held by the sheet member and supports the bus bars in a movable manner in the alignment direction.

5. The connection module according to claim 4, wherein
the support member is formed by another sheet member identical in structure to the sheet member, and
each of the bus bars has another protrusion portion and another through hole corresponding to the other sheet member.

6. The connection module according to claim 4, wherein
the support member is formed by a guide rail having a guide portion to retain the bus bars in the movable manner, and
each of the bus bars has a retainer pawl to be retained in the guide portion.

7. The connection module according to claim 1, wherein the extension and contraction structure is extendable and contractible within a plane of the sheet member.

8. A connection module to be attached to a power storage element group in which a plurality of power storage elements with positive and negative electrode terminals are aligned, the connection module comprising:

a plurality of bus bars that connect the positive and negative electrode terminals of adjacent power storage elements of the plurality of power storage elements;

a sheet member that holds the plurality of bus bars arranged in an alignment direction of the plurality of power storage elements; and a support member that is provided on a side of the plurality of bus bars opposed to a side held by the sheet member and supports the bus bars in a movable manner in the alignment direction, wherein the sheet member includes:
a plurality of hold portions that hold the bus bars; and
an extension and contraction portion that is positioned between adjacent hold portions and has an extension and contraction distance equal to or longer than an electrode pitch tolerance between the positive and negative electrode terminals of the adjacent power storage elements in the alignment direction.

* * * * *